(12) United States Patent
Lee (10) Patent No.: US 7,293,900 B1
(45) Date of Patent: Nov. 13, 2007

(54) LIGHT ATTACHING ASSEMBLY FOR BICYCLE

(76) Inventor: Wen Sung Lee, 8F-2, No. 60-2, Gong Yeh Chu 1st Road, Taichung 40767 (TW)

( * ) Notice: Subject to any disclaimer, the term of this patent is extended or adjusted under 35 U.S.C. 154(b) by 111 days.

(21) Appl. No.: 11/344,665

(22) Filed: Jan. 31, 2006

(51) Int. Cl.
*B62J 6/00* (2006.01)

(52) U.S. Cl. .................. 362/476; 362/423; 362/427

(58) Field of Classification Search ........ 362/473–476, 362/382, 423, 427; 248/224.7, 229.17, 230.8
See application file for complete search history.

(56) References Cited

U.S. PATENT DOCUMENTS

| | | | |
|---|---|---|---|
| 4,814,951 A | 3/1989 | Larsen | 362/72 |
| 4,860,177 A | 8/1989 | Simms | 362/72 |
| 5,436,810 A * | 7/1995 | Sutherland et al. | 362/473 |
| 6,568,838 B2 * | 5/2003 | Taylor et al. | 362/474 |
| 6,945,677 B2 * | 9/2005 | Fu | 362/473 |
| 7,070,295 B1 * | 7/2006 | Lee | 362/191 |

* cited by examiner

*Primary Examiner*—Thomas M. Sember
*Assistant Examiner*—Julie A. Shallenberger
(74) *Attorney, Agent, or Firm*—Charles E. Baxley (57) ABSTRACT

A light attaching device includes a base member having a bottom portion for attaching onto a bicycle portion, a housing pivotally attached to the base member and having a lock member for engaging with a spring latch of the base member and having an internal gear. A coupling strap may detachably attach the base member to the bicycle portion. A shaft is slidably engaged in the housing and has a gear for meshing with the internal gear of the housing and for adjustably positioning the shaft to the housing at selected angular position. A light device may be attached to the shaft and adjusted relative to the housing at the selected angular position together with the shaft.

12 Claims, 13 Drawing Sheets

LIGHT ATTACHING ASSEMBLY FOR BICYCLE

BACKGROUND OF THE INVENTION

1. Field of the Invention

The present invention relates to a light attaching assembly, and more particularly to a light attaching assembly having an attachment for easily and readily attached to various portions of bicycles, and for allowing a light device of the light attaching assembly to be adjusted relative to the bicycles to various selected angular positions.

2. Description of the Prior Art

Various kinds of typical light devices have been developed and provided for attaching to bicycles and for generating indicating or warning lights to light the dark environment, particularly during the night, and for preventing the bicycle riders from being hit by other vehicles inadvertently.

Some of the typical light devices comprise a number of parts or elements, such as batteries, photo cells, relays, electrical cables or wires, lamps, etc. disposed or engaged into the bicycles, such that one or more portions of the bicycles are required to be disassembled or dismantled before the parts or elements may be disposed or engaged into the bicycles.

For example, U.S. Pat. No. 4,814,951 to Larsen discloses one of the typical light devices also comprising at least a bicycle frame that is required to be disassembled or dismantled for allowing the parts or elements to be disposed or engaged into the bicycles, such that the typical light devices should be built in and sold together with the bicycles, and it is impossible for the users to assemble and to engage the parts or elements into the bicycles by themselves.

U.S. Pat. No. 4,860,177 to Simms discloses another typical light device comprising one or more clamping members for detachably attaching or securing the typical light device onto the bicycle seat column of the bicycles. The clamping members include arcuate portions or depressions formed therein for receiving the bicycle seat column of the bicycles.

However, the arcuate portions or depressions of the clamping members include a predetermined shape or structure for allowing the clamping members of the typical light device to be attached or secured onto the bicycle seat column of the bicycles only, but may not be easily attached or secured onto the other portions of the bicycles.

The present invention has arisen to mitigate and/or obviate the afore-described disadvantages of the conventional light devices for bicycles.

SUMMARY OF THE INVENTION

The primary objective of the present invention is to provide a light attaching assembly including an attaching configuration or device for easily and readily attached to various portions of various bicycles without disassembling or dismantling any part or portion of the bicycles.

The other objective of the present invention is to provide a light attaching assembly including an attaching configuration or device for allowing a light device of the light attaching assembly to be adjusted relative to the bicycles to various selected angular positions.

In accordance with one aspect of the invention, there is provided a light attaching assembly comprising a base member including a bottom portion for attaching onto a bicycle portion, and including a hook and a spring latch, a housing pivotally attached to the base member with a pivot pin, and including a lock member for engaging with the spring latch of the base member and for detachably securing the housing pivotally to the base member, the housing including a chamber and a passage formed therein and communicating with each other, and including an internal gear provided in the chamber of the housing, a coupling ring attached to the housing, a coupling strap including a first end attached to a hooking ring and including an anchoring ring, the coupling strap being engageable through the coupling ring and through the hooking ring, and the hooking ring being engageable to the hook of the base member for detachably attaching the base member onto the bicycle portion with the coupling strap, a shaft slidably engaged in the chamber and the passage of the housing and rotatable and adjustable relative to the housing, and including a gear for selectively meshing with the internal gear of the housing and for adjustably positioning the shaft to the housing at selected angular position, a spring member for biasing the gear of the shaft to mesh with the internal gear of the housing, and a light device attached to the shaft for being adjusted and positioned to the housing at the selected angular position together with the shaft. The base member may be easily and readily attached to various portions of various bicycles without disassembling or dismantling any part or portion of the bicycles, and the light device may be easily adjusted relative to the bicycles to various selected angular positions.

The base member includes a pad attached to the bottom portion for softly engaging with the bicycle portion. The base member includes at least one cavity formed in the bottom portion, and the pad includes at least one peg for engaging with the cavity of the base member and for anchoring the pad to the base member.

The shaft includes a button attached to one end and extendible out through the passage of the housing for allowing the button to be depressed against the spring member. The shaft may further include a recess for receiving the spring member and for anchoring the spring member to the shaft. The shaft includes a peg for engaging with the spring member and for anchoring the spring member to the shaft.

The light device includes a bottom bracket for attaching to the shaft. The shaft includes a casing having a channel for slidably receiving the bottom bracket of the light device. The casing of the shaft includes a spring lever having a catch for engaging with the bottom bracket of the light device and thus for catching and securing the bottom bracket of the light device to the casing of the shaft.

The light device includes a lock notch formed in the bottom bracket for receiving the catch of the casing and for detachably coupling the bottom bracket of the light device to the casing of the shaft. The spring lever of the casing includes a hand grip extended out of the casing and the housing for being depressed by a user. The housing includes an opening formed therein and communicating with the chamber of the housing for receiving the casing of the shaft.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 5:
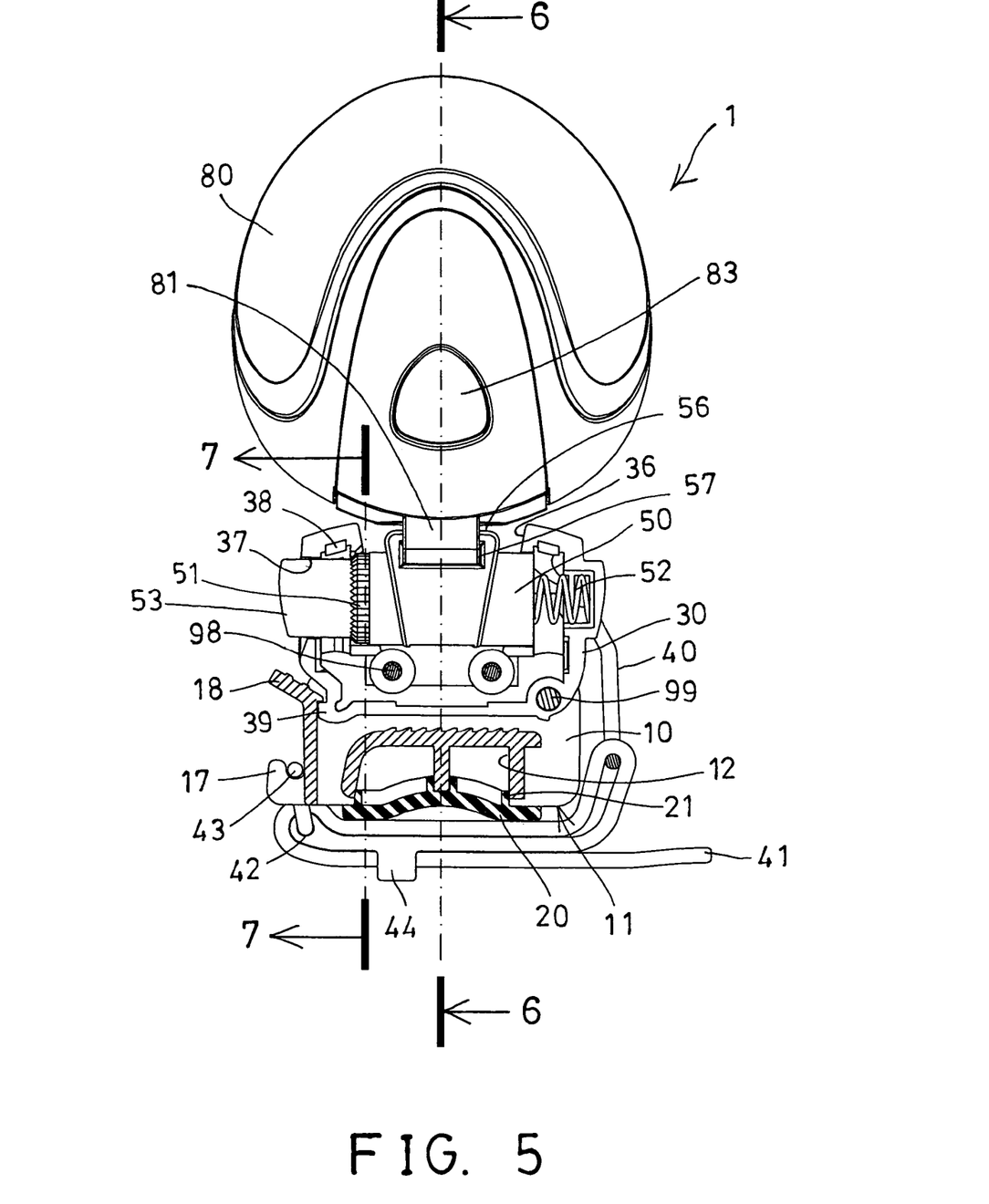
FIG. 5 is a partial cross sectional view of the light attaching assembly taken along lines 5-5 of FIG. 4.
Figure 6:
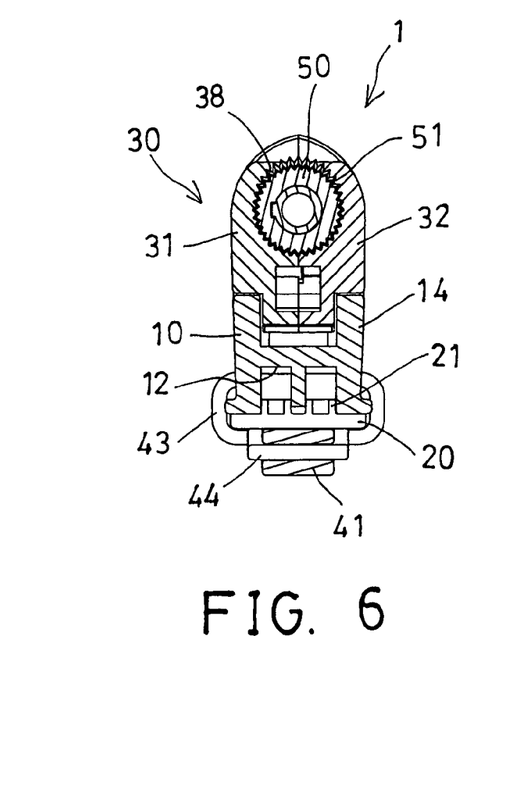
FIGS. 6, 7 are partial cross sectional views of the light attaching assembly taken along lines 6-6 and 7-7 of FIG. 5 respectively.
Figure 7:
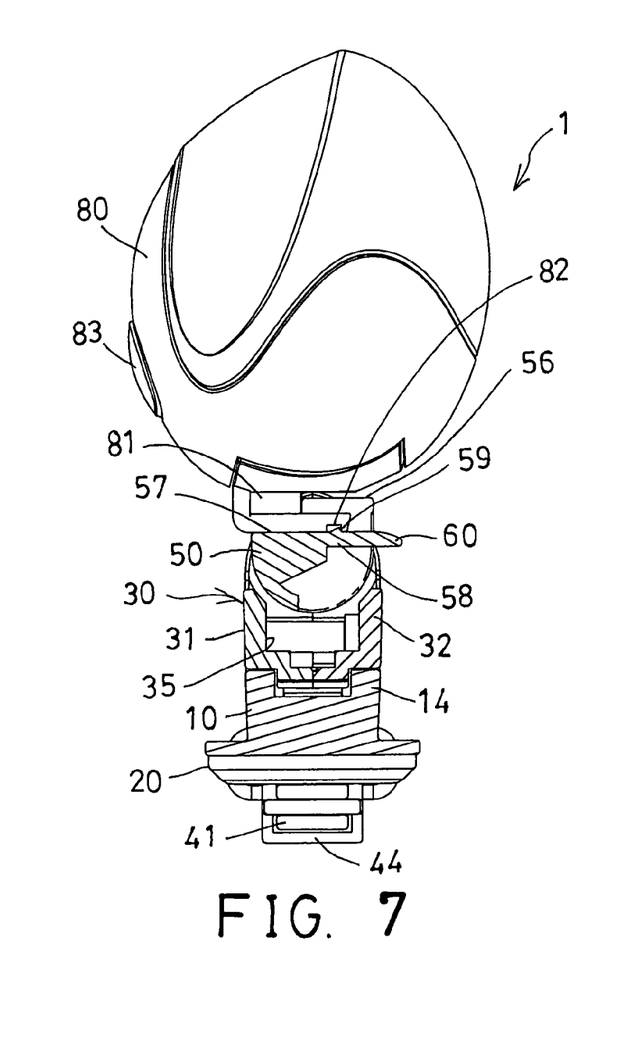

Referring to the drawings, and initially to FIGS. 1 and 9-13, a light attaching assembly 1 in accordance with the present invention is provided for easily and readily attaching to various portions of a bicycle 90, such as the seat supporting column 91, the bicycle frame 92, or the like, and comprises a base member 10 (FIGS. 2-7) including a base or bottom portion 11 (FIGS. 2-5) for attaching or for engaging with the various portions 91, 92 of the bicycle 90. It is preferable that the base member 10 includes one or more cavities 12 formed in the bottom portion 11 thereof (FIGS. 3, 5).

A gasket or pad 20 includes one or more bulges or pegs 21 extended therefrom for engaging with the cavities 12 of the base member 10 and thus for attaching or anchoring the pad 20 to the base member 10. The pad 20 is preferably made of soft or resilient or rubber or synthetic materials for softly or resiliently and safely engaging with the portions 91, 92 of the bicycle 90 and for preventing the portions 91, 92 of the bicycle 90 from being scrubbed or damaged by the base member 10.

Figure 1:
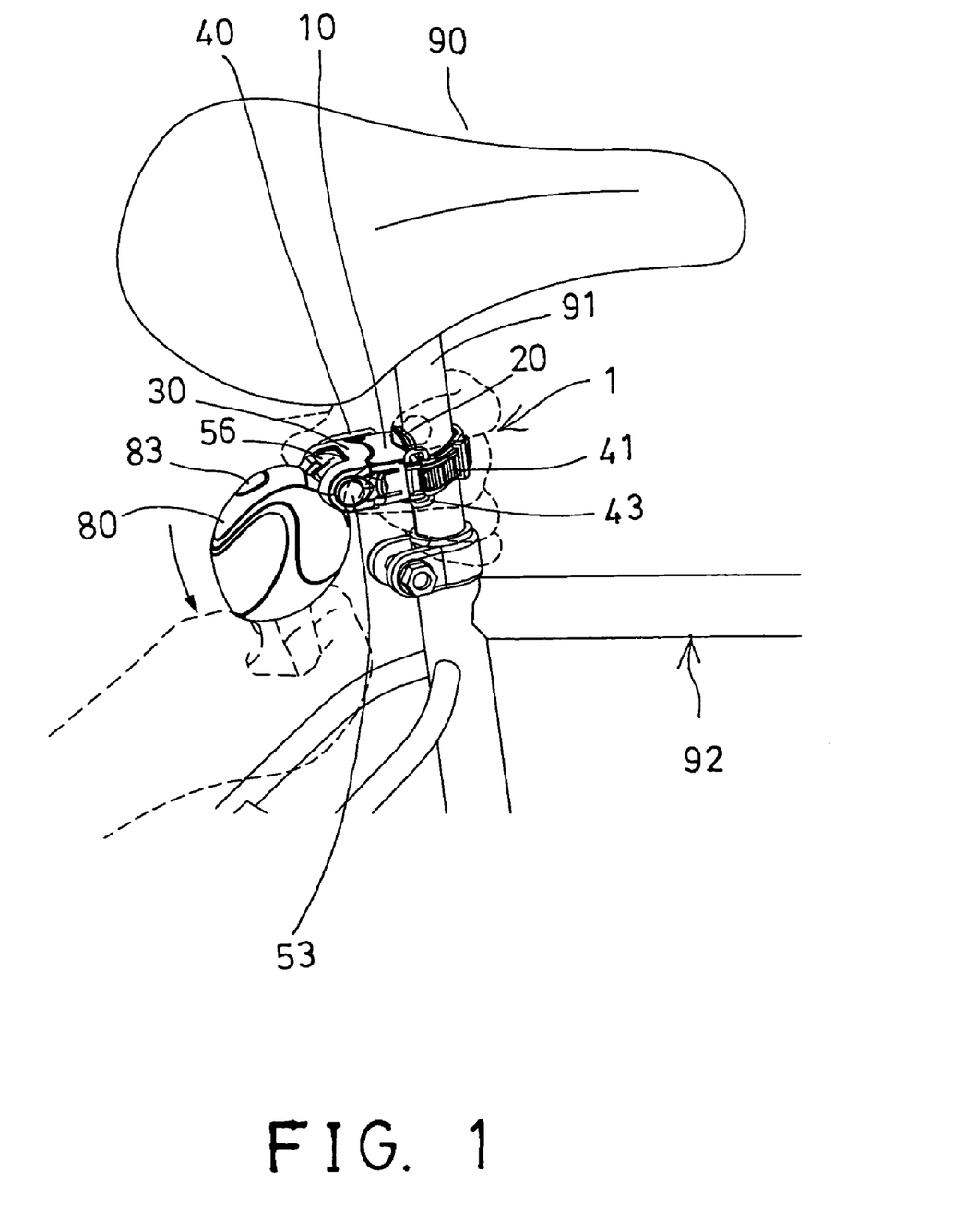
FIG. 1 is a perspective view illustrating an attachment of a light attaching assembly in accordance with the present invention onto a bicycle.
Figure 2:
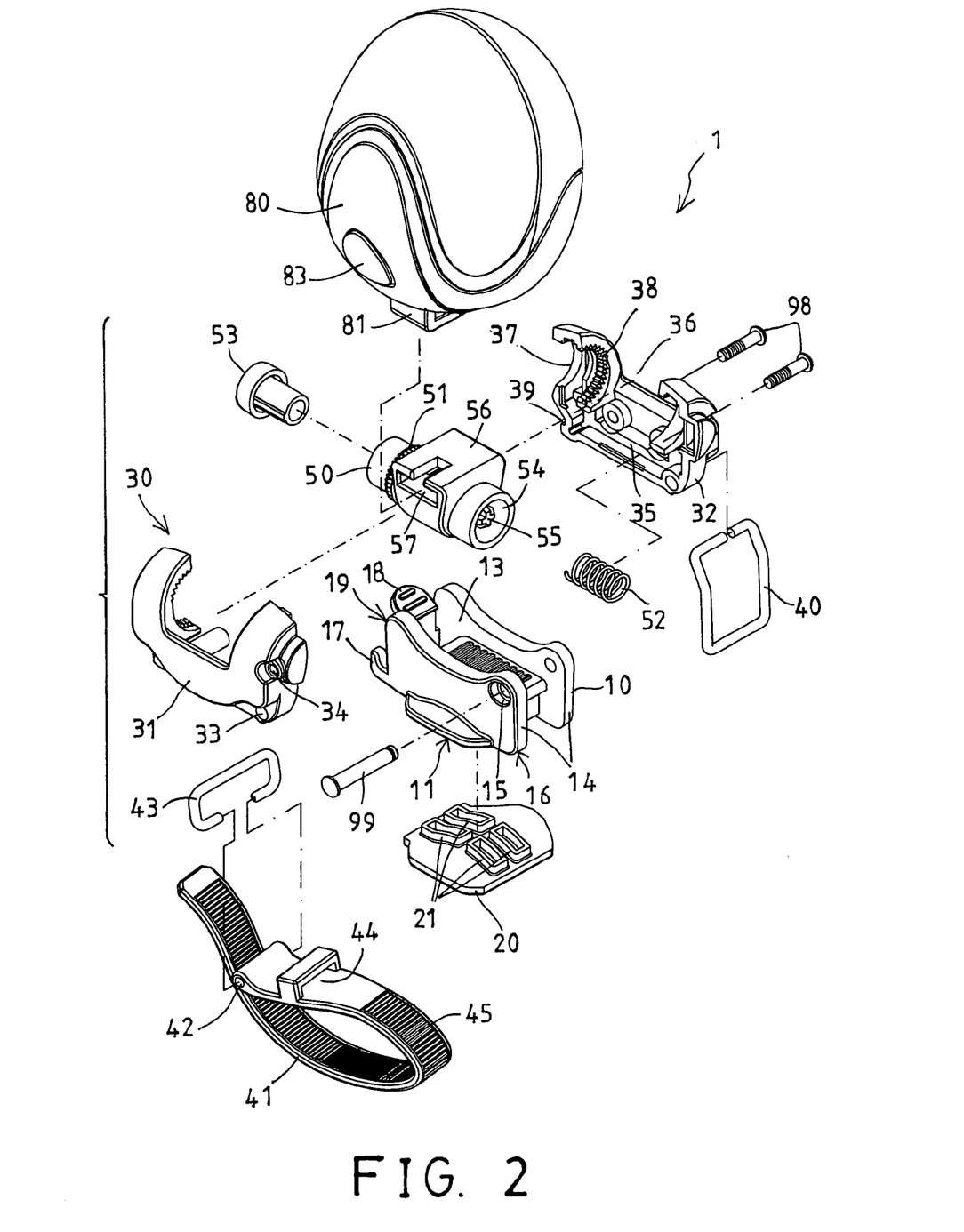
FIG. 2 is a partial exploded view of the light attaching assembly.
Figure 3:
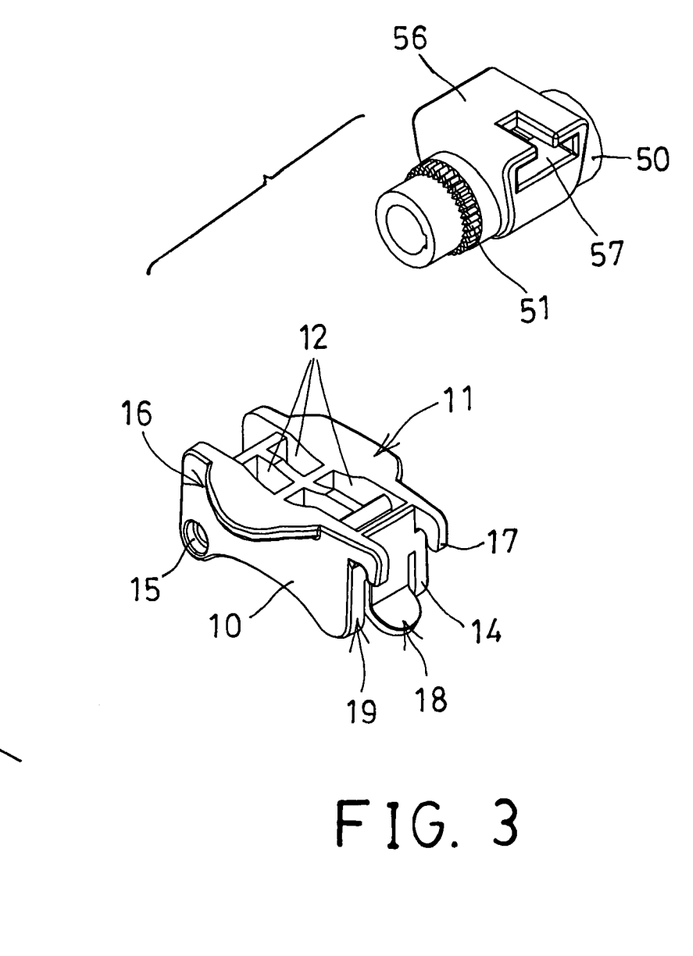
FIG. 3 is another partial exploded view of the light attaching assembly.
Figure 4:
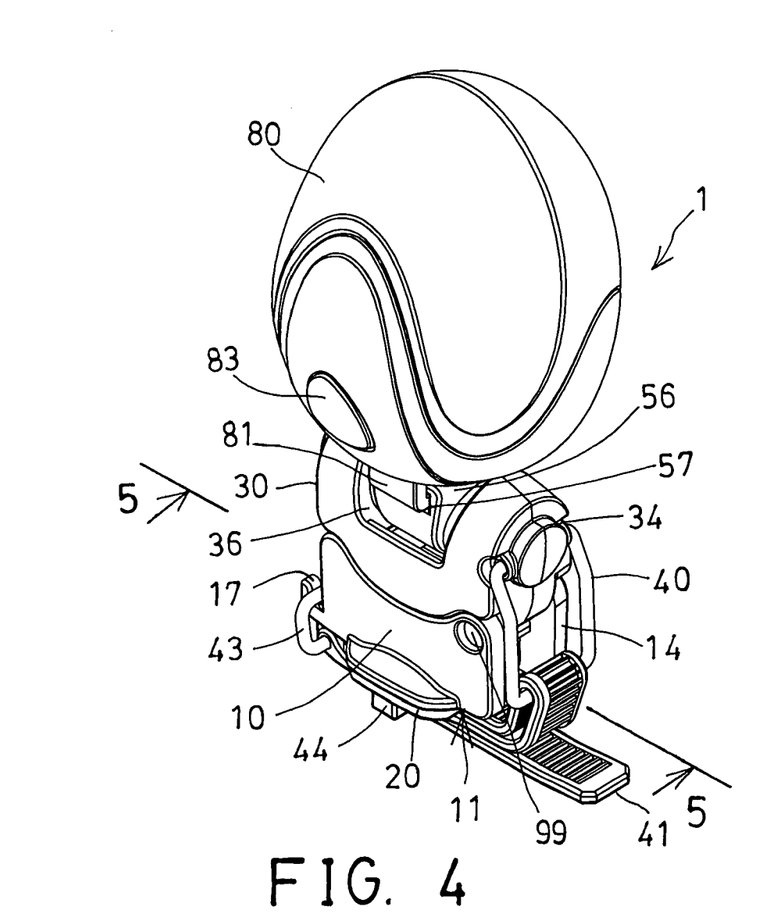
FIG. 4 is a perspective view of the light attaching assembly.

The base member 10 includes a compartment 13 formed in the upper portion thereof (FIG. 2) and defined between two walls 14, and includes an orifice 15 formed therein, such as formed in the upper portion of the walls 14 and close to one end or rear end portion 16 of the walls 14 or of the base member 10, and includes a hook 17 and a resilient or spring latch 18 provided therein, such as provided in the other or front end portion 19 of the walls 14 or of the base member 10 (FIGS. 2, 3).

A housing 30 may include one or more, such as two housing members 31, 32 detachably secured together with such as fasteners 98 (FIGS. 2, 5), and includes one end 33 having an aperture 33 formed therein for aligning with the orifice 15 of the base member 10, and for receiving a pivot pin 99 which may be rotatably or pivotally attach or couple the housing 30 to the base member 10. The housing 30 further includes a hole 34 formed therein for attaching or for engaging with a coupling ring 40.

The housing 30 includes a chamber 35 formed therein (FIG. 2) and includes an opening 36 formed in the middle portion thereof and communicating with the chamber 35 thereof, and further includes a passage 37 formed in the other end thereof and also communicating with the chamber 35 thereof, and further includes an internal gear 38 formed or provided in the chamber 35 or in the inner portion of the other end thereof and a lock detent or member 39 formed or provided in the outer portion of the other end thereof. The spring latch 18 of the base member 10 may be engaged with the lock member 39 of the housing 30 (FIG. 5) for releasably latching the housing 30 to the base member 10.

Figure 8:
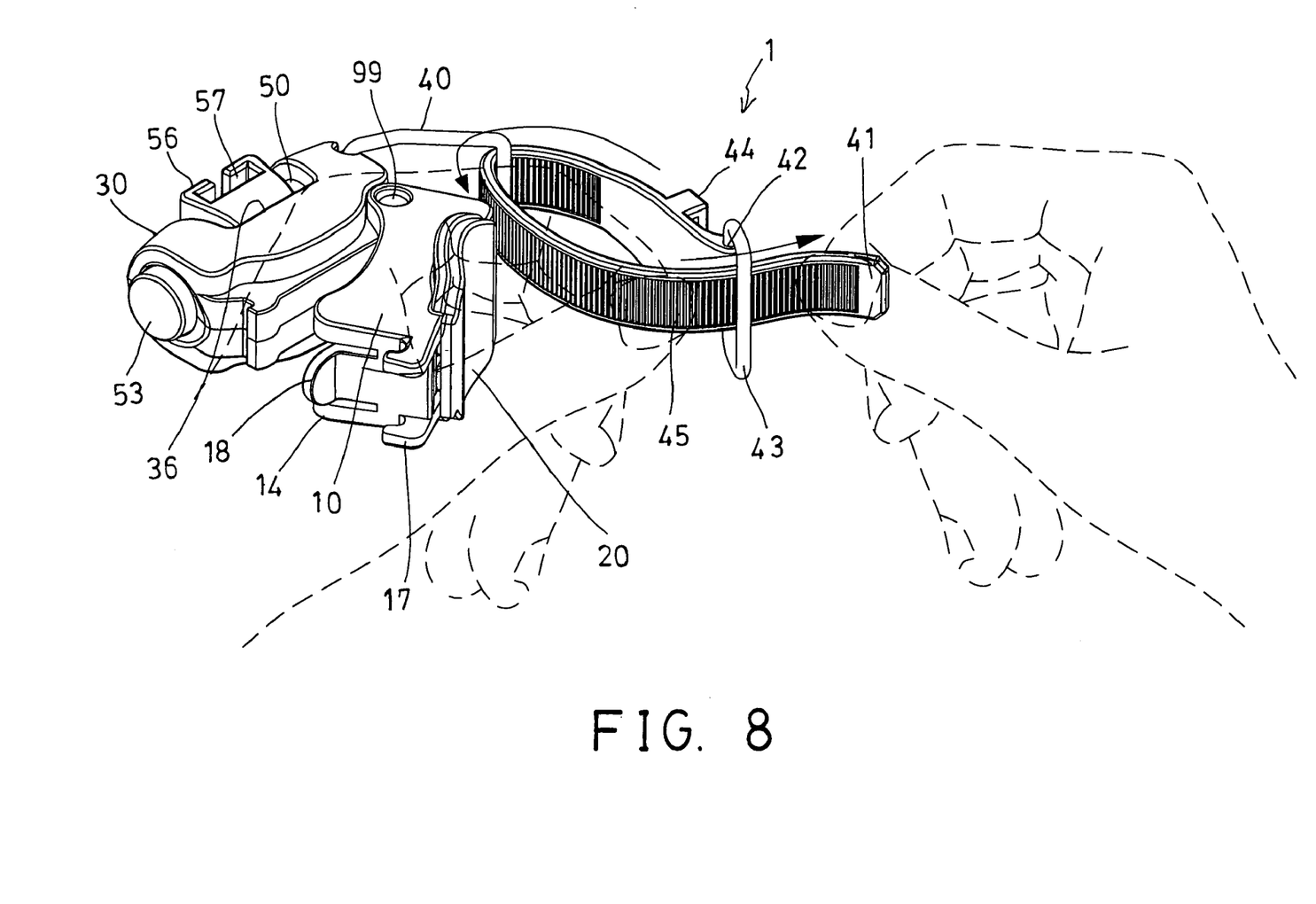
FIG. 8 is a perspective view illustrating the operation of the light attaching assembly.
Figure 9:
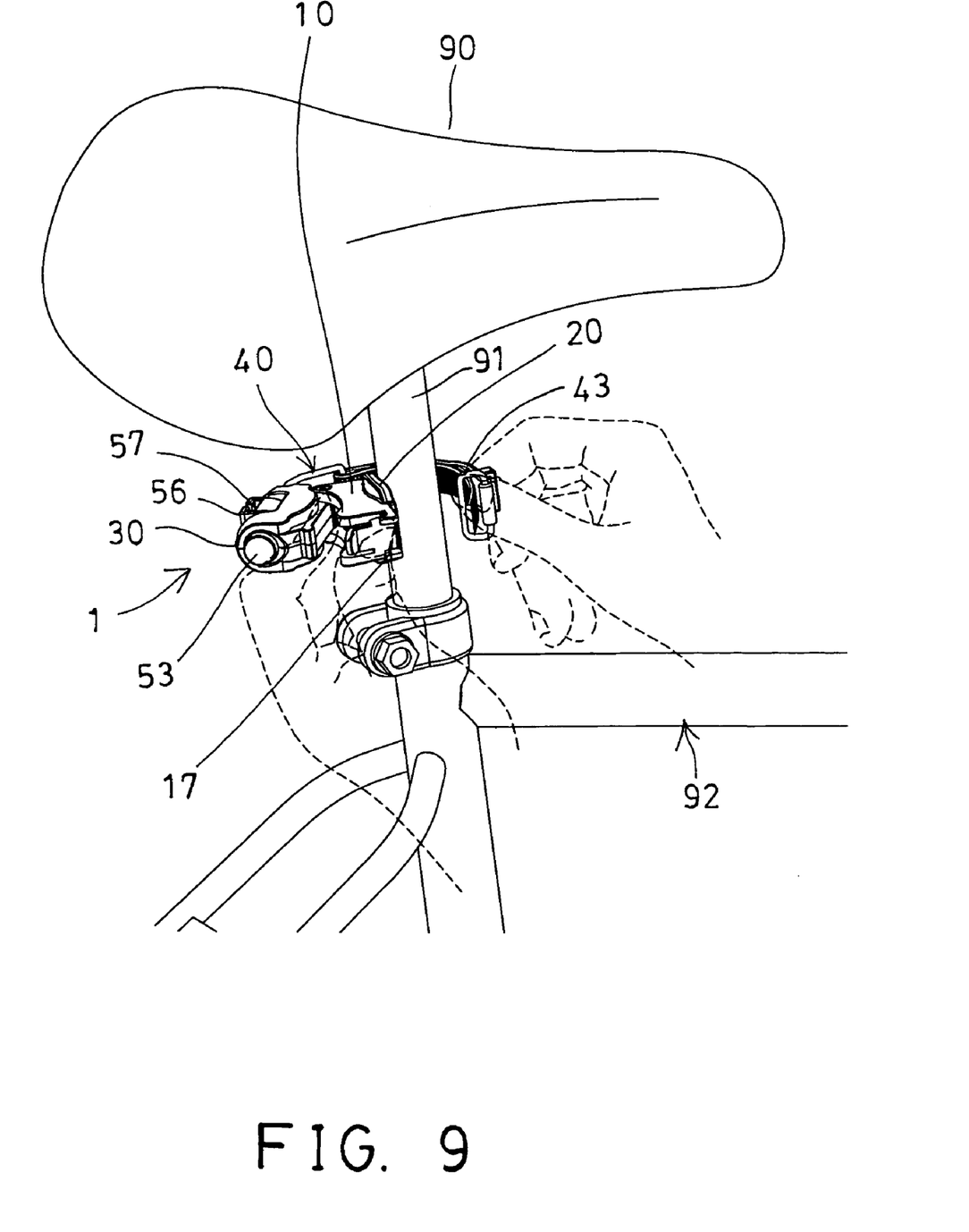
FIGS. 9, 10, 11, 12, 13 are perspective views similar to FIG. 1, illustrating the operation of the light attaching assembly.
Figure 10:
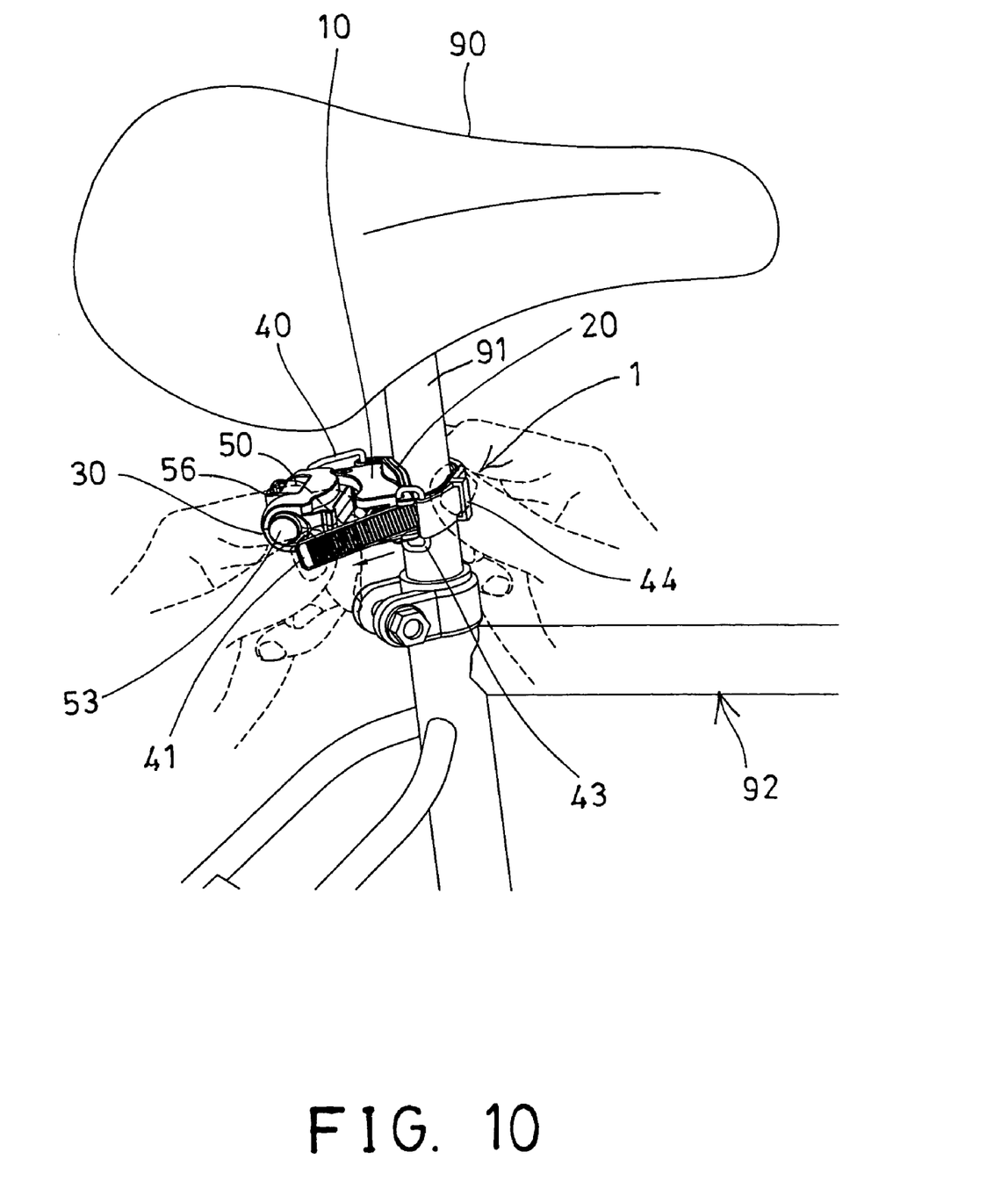

A fastener or coupling strap 41 includes one end 42 attached or secured to a hooking ring 43, and includes an anchoring loop or ring 44 formed or provided thereon and located close to the one end 42 thereof, and includes a serrated surface or a number of projections 45 formed or provided on either or both surfaces thereof. In operation, the coupling strap 41 may first be engaged through the coupling ring 40 and then engaged through the hooking ring 43 (FIG. 8), and the hooking ring 43 may then be engaged or hooked to the hook 17 of the base member 10 (FIGS. 9, 10), for attaching the base member 10 onto the portions 91, 92 of the bicycle 90 with the coupling strap 41.

Figure 11:
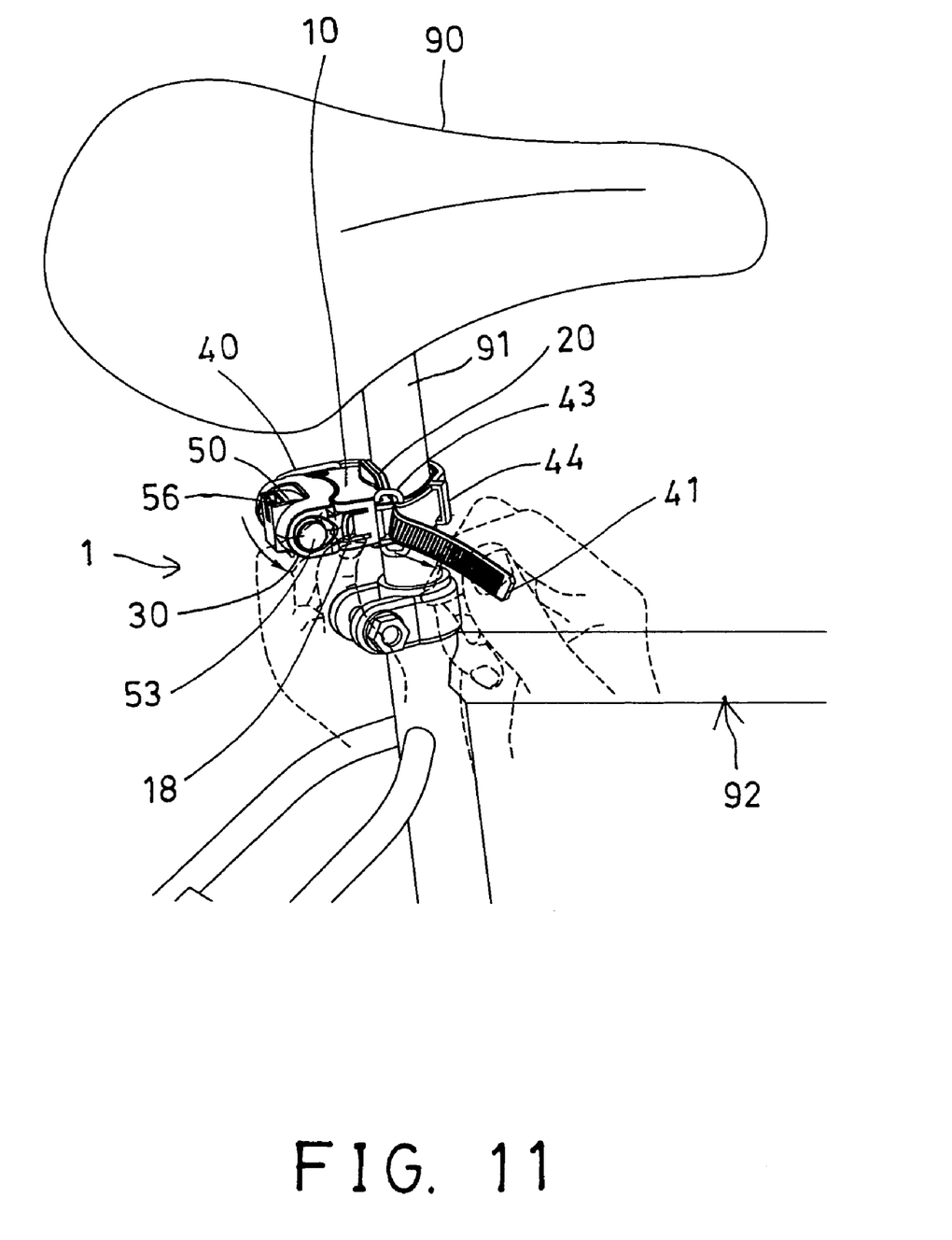
Figure 12:
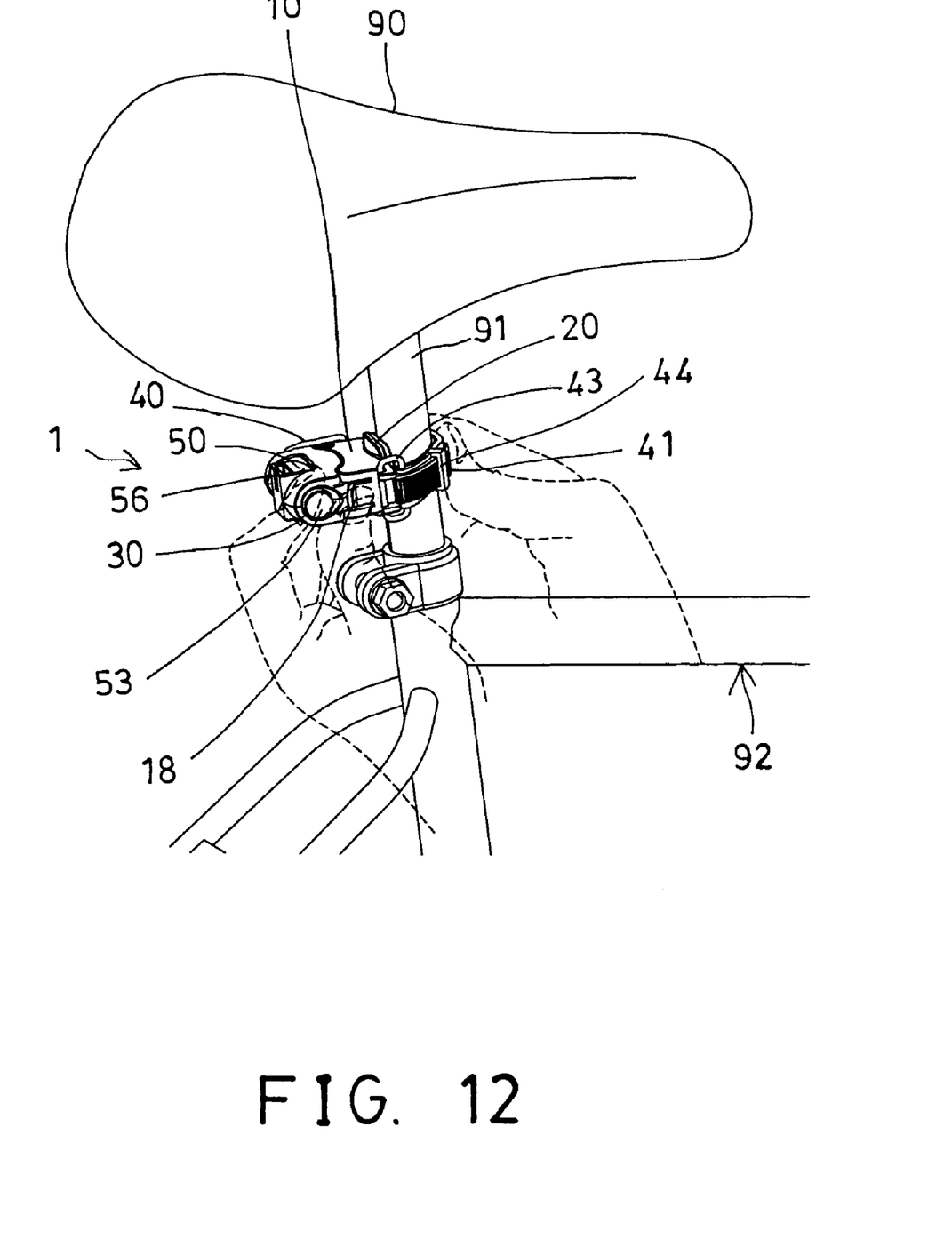

As shown in FIGS. 11, 12, the coupling strap 41 may then be forced or pulled and folded relative to the hooking ring 43, and may then be engaged through the anchoring ring 44 for detachably and solidly securing or attaching the base member 10 onto the portions 91, 92 of the bicycle 90. The portions 91, 92 of the bicycle 90 may be resiliently or safely or softly engaged between the pad 20 of the base member 10 and the coupling strap 41.

Figure 14:
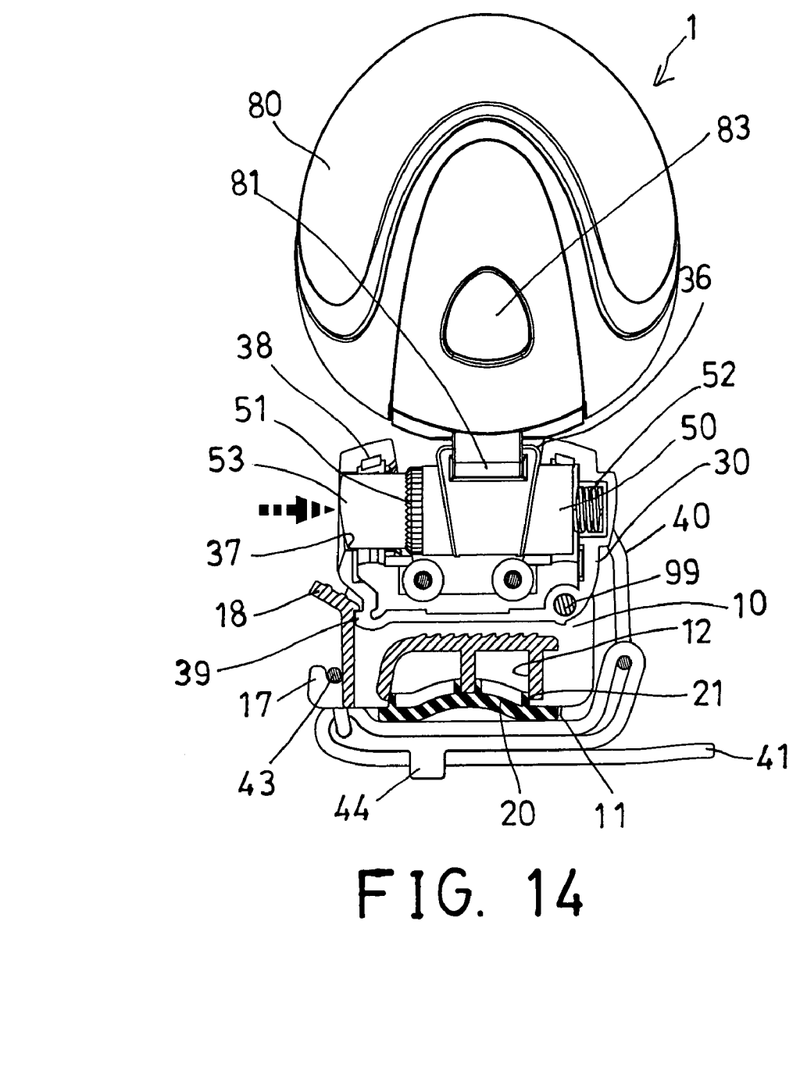
FIGS. 14, 15 are partial cross sectional views similar to FIG. 5, illustrating the operation of the light attaching assembly.
Figure 15:
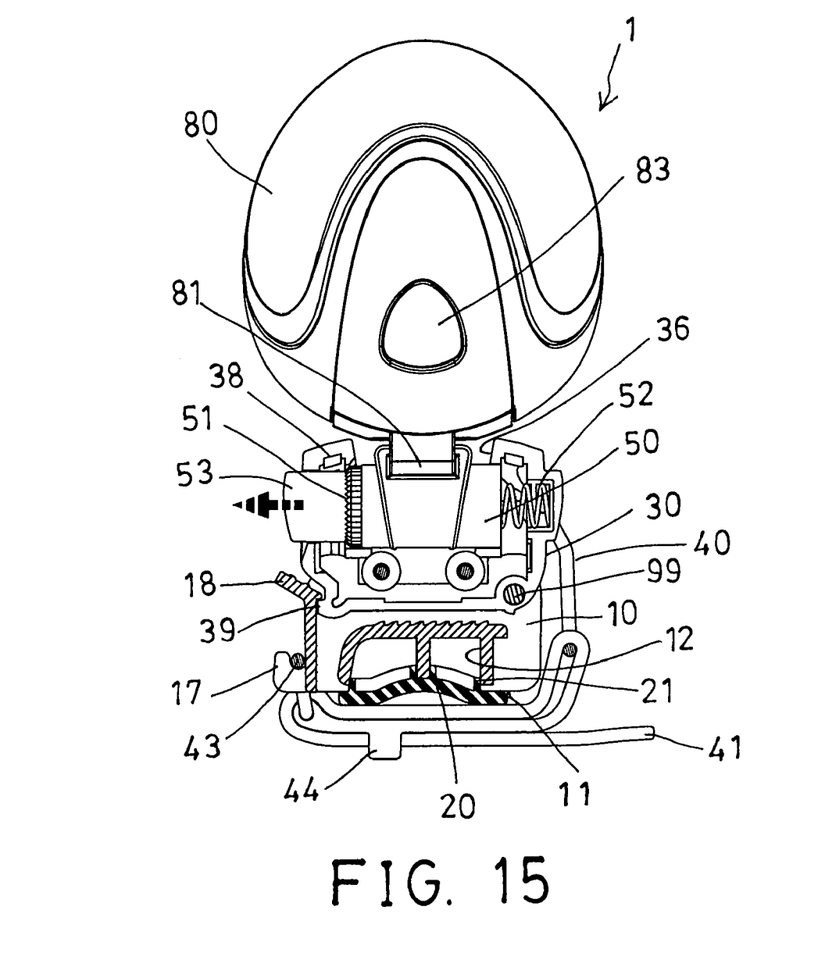

As shown in FIGS. 2, 3, and 5, a shaft 50, such as a tubular shaft 50 is slidably engaged in the chamber 35 and/or the passage 37 of the housing 30, and includes a gear 51 formed or provided on one end thereof for selectively meshing or engaging with the internal gear 38 of the housing 30, and includes a spring member 52 engaged between the other end of the shaft 50 and the housing 30 for biasing the gear 51 of the shaft 50 to mesh or engage with the internal gear 38 of the housing 30 (FIGS. 5, 14-15).

The shaft 50 may include a knob or button 53 engaged or attached onto one end thereof and slidable or extendible out through the passage 37 of the housing 30, for allowing the button 53 to be depressed or actuated by the users against the spring member 52, and for selectively moving or disengaging the gear 51 of the shaft 50 from the internal gear 38 of the housing 30. As shown in FIG. 2, it is preferable that the shaft 50 includes a recess 54 and a peg 55 for receiving or for anchoring and/or for positioning the spring member 52 to the shaft 50.

The shaft 50 includes a casing 56 formed or provided on the middle portion thereof and received in or extended out of the opening 36 of the housing 30 and includes a channel 57 formed in the casing 56 (FIG. 2), and includes a spring lever 58 extended or provided in the inner portion of the casing 56 (FIGS. 7, 16-17) and the spring lever 58 includes a catch 59 extended therefrom, and includes a free end or hand grip 60 extended out of the casing 56 and also extended out of the housing 30 for being depressed or actuated or operated by the users.

The light attaching assembly 1 further includes a light device 80 having a bottom bracket 81 for engaging into the channel 57 of the casing 56 (FIGS. 4, 5, 7), and the light device 80 includes a lock notch 82 formed in the bottom bracket 81 for receiving or engaging with the catch 59 of the casing 56 or of the shaft 50 (FIG. 7) and for releasably or detachably coupling the bottom bracket 81 of the light device 80 to the casing 56 or the shaft 50. The catch 59 of the casing 56 or of the shaft 50 may be selectively disengaged from the lock notch 82 of the bottom bracket 81 by depressing or actuating the hand grip 60.

The light device 80 may further include one or more switch buttons 83 provided thereon for actuating or operating the light bulbs or light members or lamps (not shown) received therein. For example, when the switch button 83 is depressed once, the light bulbs or light members or lamps may all be energized or operated. When the switch button 83 is depressed again, the lamps may be energized alternatively or in series from middle lamps toward the two side lamps, when the switch button 83 is depressed again, the lamps may be energized alternatively or in series from two side lamps toward the middle lamps.

When the switch button 83 is depressed again, the lamps may be energized and flashed quickly, and when the switch button 83 is depressed again, the lamps may be energized and flashed slowly, and when the switch button 83 is depressed again, all of the lamps may be switched off, for example. The light device 80 may further include a chamber formed therein (not shown) for receiving the lamps and the batteries or other members.

In operation, as shown in FIGS. 9-12, the base member 10 may be attached or secured onto the various portions 91, 92 of the bicycle 90 with the coupling strap 41 and the hooking ring 43. As shown in FIGS. 5 and 14-17, when the gear 51 of the shaft 50 is moved or disengaged from the internal gear 38 of the housing 30 by depressing the button 53, the shaft 50 and the casing 56 and thus the light device 80 may be rotated and adjusted relative to the housing 30 to any selected angular position.

Figure 13:
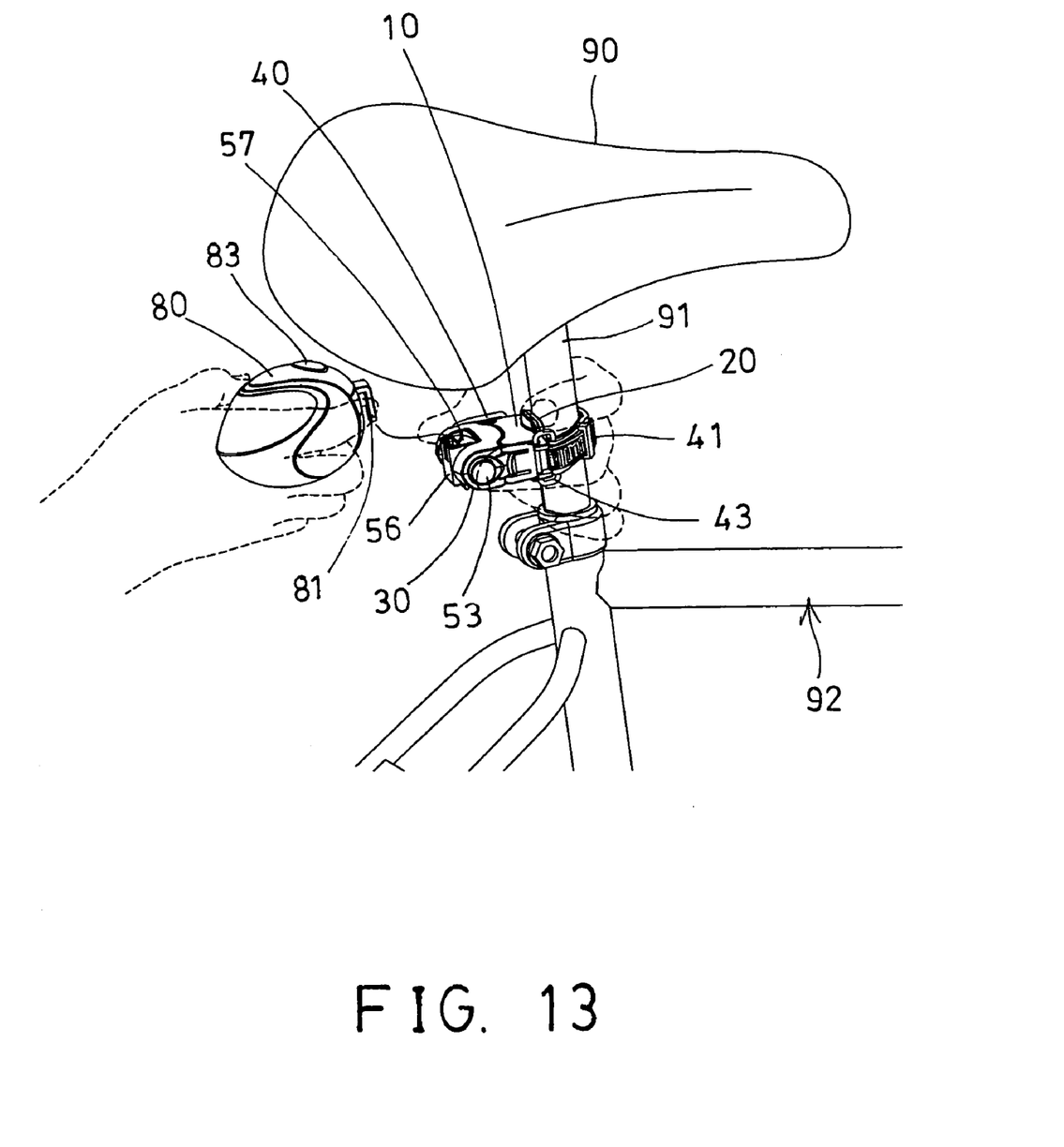
Figure 16:
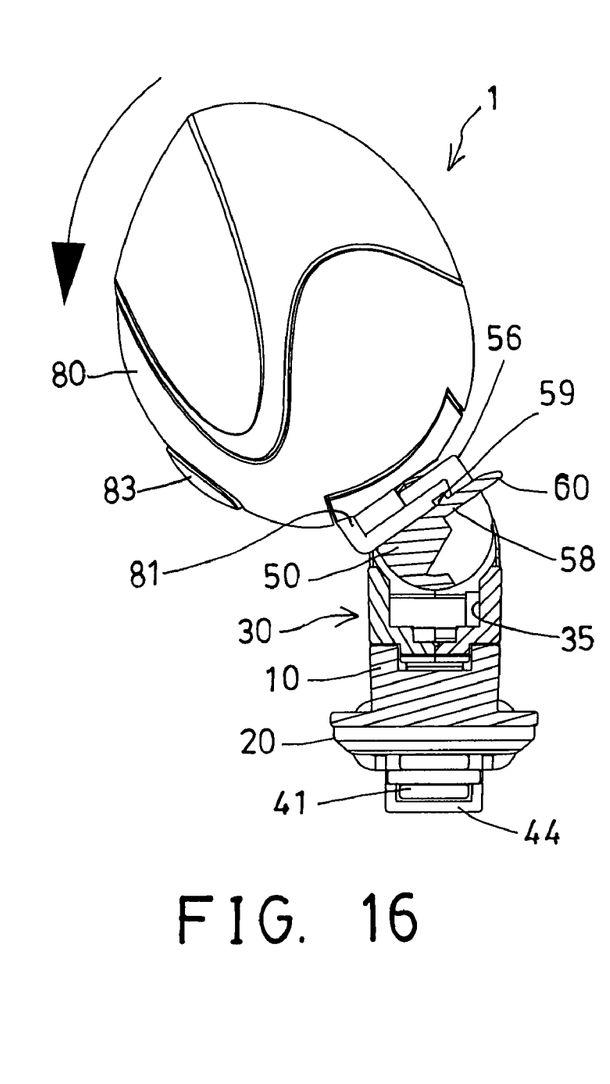
FIGS. 16, 17 are partial cross sectional views similar to FIG. 7, illustrating the operation of the light attaching assembly.
Figure 17:
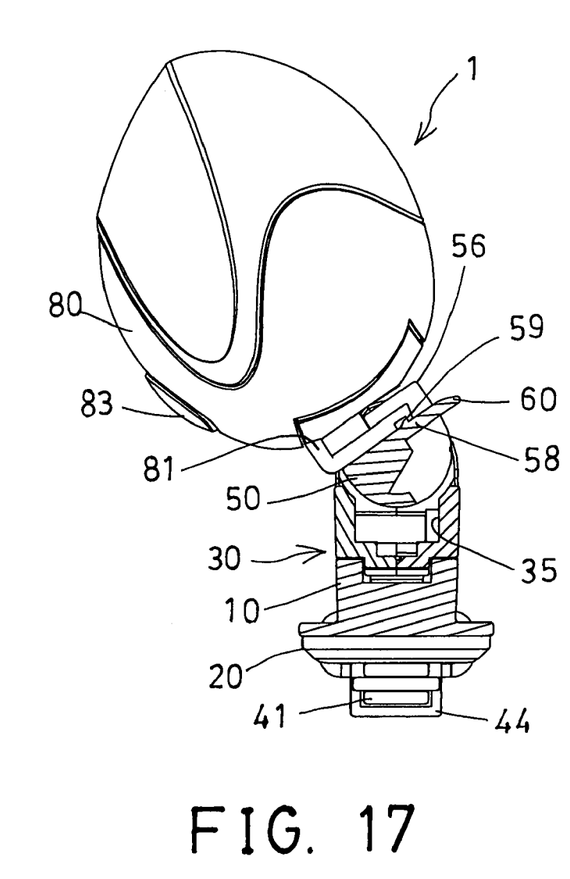

The gear 51 of the shaft 50 may be forced and moved to engage with the internal gear 38 of the housing 30 again by the spring member 52 when the button 53 is released, in order to anchor and position or secure the shaft 50 and thus the light device 80 to the housing 30 at the selected angular position. As shown in FIGS. 13 and 16-17, the catch 59 of the casing 56 or of the shaft 50 may be disengaged from the lock notch 82 of the bottom bracket 81 by depressing the hand grip 60 to allow the bottom bracket 81 of the light device 80 to be disengaged or detached from the casing 56 or the shaft 50.

Accordingly, the light attaching assembly in accordance with the present invention includes an attaching configuration or device for easily and readily attached to various portions of various bicycles without disassembling or dismantling any part or portion of the bicycles, and for allowing the light device of the light attaching assembly to be adjusted relative to the bicycles to various selected angular positions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A light attaching assembly comprising:
   a base member including a bottom portion for attaching onto a bicycle portion, and including a hook and a spring latch,
   a housing pivotally attached to said base member with a pivot pin, and including a lock member for engaging with said spring latch of said base member and for detachably securing said housing pivotally to said base member, said housing including a chamber and a passage formed therein and communicating with each other, and including an internal gear provided in said chamber of said housing,
   a coupling ring attached to said housing,
   a coupling strap including a first end attached to a hooking ring and including an anchoring ring, said coupling strap being engageable through said coupling ring and through said hooking ring, and said hooking ring being engageable to said hook of said base member for detachably attaching said base member onto the bicycle portion with said coupling strap,
   a shaft slidably engaged in said chamber and said passage of said housing and rotatable and adjustable relative to said housing, and including a gear for selectively meshing with said internal gear of said housing and for adjustably positioning said shaft to said housing at selected angular position,
   a spring member for biasing said gear of said shaft to mesh with said internal gear of said housing, and
   a light device attached to said shaft for being adjusted and positioned to said housing at the selected angular position together with said shaft.

2. The light attaching assembly as claimed in claim 1, wherein said base member includes a pad attached to said bottom portion for softly engaging with the bicycle portion.

3. The light attaching assembly as claimed in claim 2, wherein said base member includes at least one cavity formed in said bottom portion, and said pad includes at least one peg for engaging with said at least one cavity of said base member and for anchoring said pad to said base member.

4. The light attaching assembly as claimed in claim 1, wherein said shaft includes a button attached to one end and extendible out through said passage of said housing for allowing said button to be depressed against said spring member.

5. The light attaching assembly as claimed in claim 1, wherein said shaft includes a recess for receiving said spring member and for anchoring said spring member to said shaft.

6. The light attaching assembly as claimed in claim 1, wherein said shaft includes a peg for engaging with said spring member and for anchoring said spring member to said shaft.

7. The light attaching assembly as claimed in claim 1, wherein said light device includes a bottom bracket for attaching to said shaft.

8. The light attaching assembly as claimed in claim 7, wherein said shaft includes a casing having a channel for slidably receiving said bottom bracket of said light device.

9. The light attaching assembly as claimed in claim 8, wherein said casing of said shaft includes a spring lever having a catch for engaging with said bottom bracket of said light device and for catching said bottom bracket of said light device to said casing of said shaft.

10. The light attaching assembly as claimed in claim 9, wherein said light device includes a lock notch formed in said bottom bracket for receiving said catch of said casing and for detachably coupling said bottom bracket of said light device to said casing of said shaft.

11. The light attaching assembly as claimed in claim 9, wherein said spring lever of said casing includes a hand grip extended out of said casing and said housing for being depressed by a user.

12. The light attaching assembly as claimed in claim 8, wherein said housing includes an opening communicating with said chamber of said housing for receiving said casing of said shaft.

* * * * *